United States Patent [19]

Lee et al.

[11] Patent Number: 4,942,012
[45] Date of Patent: Jul. 17, 1990

[54] PREPARATION OF LAMINATED STRUCTURES BY THERMOFORMING

[75] Inventors: Walter J. Lee, Albany, N.Y.; Catherine S. Hissem, Pittsfield, Mass.

[73] Assignee: General Electric Company, Schenectady, N.Y.

[21] Appl. No.: 396,834

[22] Filed: Aug. 21, 1989

Related U.S. Application Data

[63] Continuation of Ser. No. 270,992, Nov. 14, 1988, abandoned.

[51] Int. Cl.$^5$ ..................... B29C 51/10; B29C 51/42
[52] U.S. Cl. ..................... 264/510; 264/512; 264/522; 264/546
[58] Field of Search ............. 264/510, 512, 521, 526, 264/545, 522, 553, 546, 548; 425/504

[56] References Cited

U.S. PATENT DOCUMENTS

| 2,978,376 | 4/1961 | Hulse | 264/554 |
| 3,161,705 | 12/1964 | Kindseth et al. | 264/510 |
| 4,116,736 | 9/1978 | Sanson et al. | 264/545 |

OTHER PUBLICATIONS

Gruenwald, Dr. G., P.E., *Thermoforming a Plastic Processing Guide*, 1987, pp. 37–39 and 134 and 135.

Primary Examiner—Jill L. Heitbrink
Attorney, Agent, or Firm—William H. Pittman; James C. Davis, Jr.

[57] ABSTRACT

Thermoplastic layers are vacuum thermoformed to produce laminated structures by perforating all layers to be formed except the layer outermost from the mold. Thus, the non-perforated layer is attracted to the mold, serving as a diaphragm for the other layers or consolidating therewith to form the desired article.

12 Claims, 2 Drawing Sheets

PREPARATION OF LAMINATED STRUCTURES BY THERMOFORMING

This application is a continuation of application Ser. No. 270,992, filed Nov. 14, 1988 now abandoned.

This invention relates to thermoforming operations, and more particularly to the use of such operations to fabricate articles having laminated structures.

Thermoforming is a method of preparing articles from thermoplastics in which a sheet of the thermoplastic is heated until it is pliable, and is then formed to a mold by gaseous pressure. This pressure may be utilized in two ways, or combinations thereof: by exerting pressure on the sheet or film to cause it to conform to the mold, or by drawing a vacuum thereon from within or underneath the mold. The invention is specifically directed to the latter method, hereinafter designated "vacuum thermoforming". For an excellent review of thermoforming in a general sense, reference is made to the book *Thermoforming* by G. Gruenwald (Lancaster, PA: Technomic Publishing Co., Inc., 1987), the relevant portions of which are incorporated herein by reference.

It is often advantageous to produce a molded article from multiple layers of sheet or film material. For example, ductile layers may be interleaved with more brittle ones for enhanced impact toughness, resin-rich surface layers may be provided to improve the article's appearance, or fiber-reinforced layers having different fiber orientations may be laminated to increase strength.

Vacuum thermoforming of such multilayer structures has presented problems, since only the lowermost layer is attracted to the mold under vacuum. This problem has typically been overcome by prelaminating the different layers into a single laminate in an upstream process, and thermoforming the prelaminated assemblage. However, the upstream prelaminating step is cumbersome.

The present invention provides a simple method for producing multilayer vacuum thermoformed articles. Said method involves a minimum of processing steps and avoids the necessity of prelaminating operations.

The invention is a method for producing a thermoformed article which comprises the steps of:

feeding multiple layers of formable material to a heated mold, the layer outermost from the mold being nonperforated and the other layers being perforated;

vacuum forming said layers to the mold contours, thus producing a molded article; and removing said molded article from the mold.

In the drawings, FIGS. 1–2 show successive conventional vacuum thermoforming steps. FIG. 3 is a schematic view illustrating the relative positions of the thermoforming mold and multiple layers to be thermoformed, according to the invention.

The method of this invention is applicable to multiple layers of any thermoformable material. Included are thermoplastic resins of all types, illustrated by vinyl polymers, polyamides and polyesters. Both male and female molds may be employed. The method is especially applicable to multiple composite layers, each such layer comprising a fibrous substrate impregnated with thermoplastic resin.

In the first step of the method of this invention, multiple layers of formable materials as described hereinabove are fed to a heated mold. Where necessary, said layers may be preheated to render them flexible.

It is essential that the layer outermost from the mold be non-perforated. Thus, this layer may be a conventional thermoplastic sheet or film which forms part of the molded article. It is also contemplated to employ an outermost layer which does not participate in the structure of the article but merely serves as a diaphragm to create a seal during the vacuum thermoforming operation. Suitable diaphragms of this type are typically elastomeric in nature.

The layers between the outermost layer and the mold are perforated, to permit them to pass a vacuum which will attract the outermost layer. Perforations may be provided therein by any suitable means, including passage of said layers over a spiked roller or the like. The size of the perforations is not critical but may be determined by simple experimentation, so as to provide the necessary vacuum passage and also produce an article having the desired properties. Perforations with a cross section of about 0.1–1.0 cm. are typical.

In the second step, the non-perforated and perforated layers are formed to the mold contours by vacuum action. This is typically achieved by drawing a vacuum from the opposite side of the mold, the mold being provided with suitable orifices so that the vacuum attracts the layers of formable material into uniform contact with the mold surface.

During the thermoforming operation, the mold is heated so as to maintain the multiple layers in their thermoplastic state, whereby they conform to the contours of the mold. When confirmation is adequate, the mold and its contents are cooled and the molded article is removed.

If imperviousness of the molded article to gases is desired, the period of molding should be adequate to cause the perforated layers to flow, sealing the perforations and converting the perforated layers into solid layers. Suitable residence times for the article in the mold can also be determined by simple experimentation.

BRIEF DESCRIPTION OF THE DRAWINGS

Reference is now made to the drawings in which FIGS. 1–2 represent conventional thermoforming operations applied to multilayer structures. There is shown a hollow female mold 11, through which a vacuum is drawn via conduit 13. Multiple thermoplastic layers 15 are attracted by passage of the vacuum through suitable orifices (not shown) in the mold surface. After a suitable heating period, the article 21 having the contours of the mold is removed therefrom.

FIG. 3 shows schematically the relative locations of the mold and the layers to be thermoformed, in accordance with the invention. Above mold 11 are three layers of formable material, although it is within the scope of the invention to use less or more layers. The outermost layer 31 is non-perforated and the other layers 33 and 35 are perforated. Thus, all layers are attracted by the vacuum drawn from within the mold and are made to adhere uniformly to the mold surface.

Figure 1:
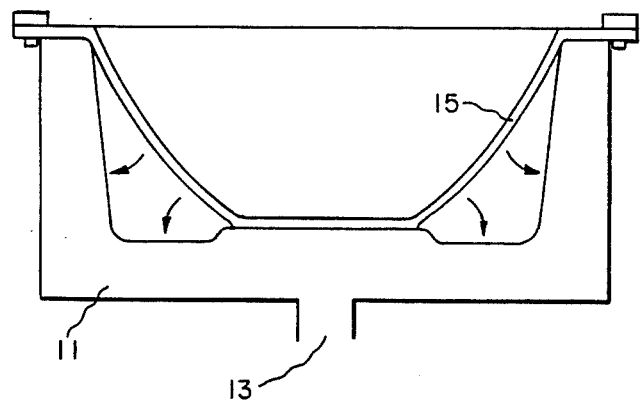
FIGS. 1 and 2 are conventional thermoforming operations applied to multilayer structures.
Figure 2:
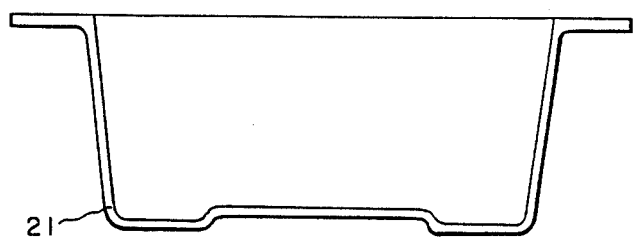
Figure 3:
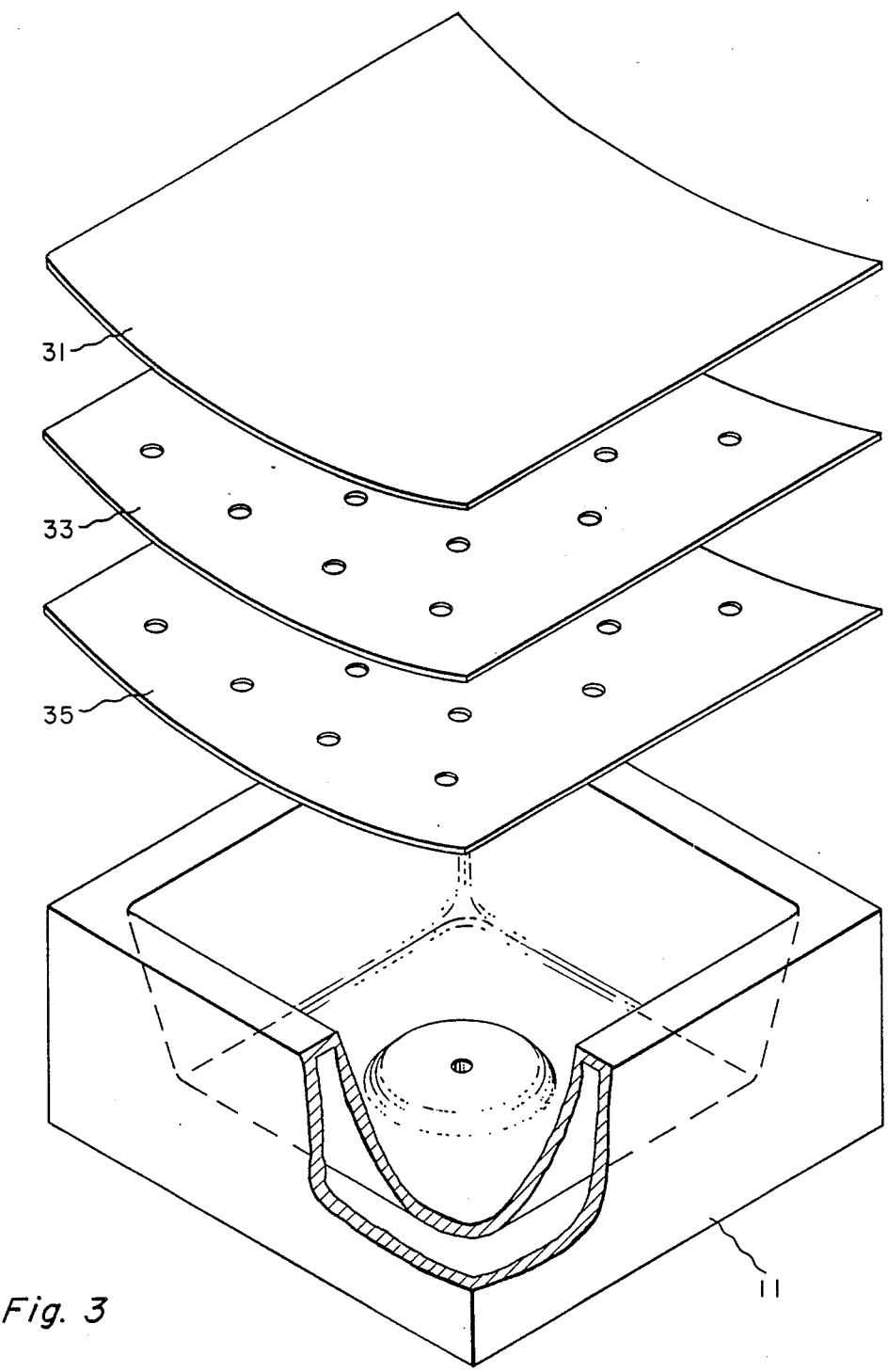
FIG. 3 shows schematically the relative locations of the mold and the layers to be thermoformed, in accordance with the invention.

The invention is illustrated by a laboratory-scale molding operation involving three layers of poly(butylene terephthalate)-impregnated glass fiber cloth containing 30% (by weight) glass fiber, and an outermost layer of unfilled poly(butylene terephthalate). The filled layers were each perforated with a number of holes about 0.5 cm. in diameter.

The mold was preheated at 121° C. and the layers were attracted thereto by vacuum action. All four layers were attracted and excellent fit in the mold was obtained. The mold was then cooled and the thermoformed article, having excellent appearance and integrity, was removed. The perforations were not noticeable, resin flow having been sufficient to fill them.

What is claimed is:

1. A method for producing a thermoformed article which comprises the steps of:
    feeding multiple layers of formable material to a mold while heating said mold, the layer outermost from the mold being non-perforated and the other layers being perforated;
    vacuum forming said layers to the mold contours, thus producing a molded article;
    heating the perforated layers to cause them to flow and seal the perforations; and
    removing said molded article from the mold.

2. A method according to claim 1 wherein the mold is a female mold.

3. A method according to claim 2 wherein the non-perforated layer forms part of the molded article.

4. A method according to claim 3 wherein the formable material comprises a thermoplastic resin.

5. A method according to claim 4 wherein the resin is a polyester.

6. A method according to claim 5 wherein the polyester is poly(butylene terephthalate).

7. A method according to claim 4 wherein the formable material is a composite comprising a fibrous substrate impregnated with said thermoplastic resin.

8. A method according to claim 2 wherein the non-perforated layer does not form part of the article but serves as a diaphragm to create a seal during the forming operation.

9. A method according to claim 8 wherein the formable material in the perforated layers comprises a thermoplastic resin.

10. A method according to claim 9 wherein the resin is a polyester.

11. A method according to claim 10 wherein the polyester is poly(butylene terephthalate).

12. A method according to claim 8 wherein the formable material is a composite comprising a fibrous substrate impregnated with said thermoplastic resin.

* * * * *